United States Patent [19]
Delatorre

[11] 4,091,683
[45] May 30, 1978

[54] SINGLE CHANNEL ELECTRICAL COMPARATIVE MEASURING SYSTEM

[75] Inventor: Leroy C. Delatorre, Houston, Tex.

[73] Assignee: Panex, Inc., Houston, Tex.

[21] Appl. No.: 726,771

[22] Filed: Sept. 27, 1976

[51] Int. Cl.² ............................................. G01L 9/12
[52] U.S. Cl. .................................... 73/718; 307/118
[58] Field of Search .......... 73/398 C, 407 PR, 304 C; 324/61 R; 307/118

[56] References Cited
U.S. PATENT DOCUMENTS

| | | |
|---|---|---|
| 3,237,449 | 3/1966 | Brandt ........................ 73/398 C X |
| 3,518,536 | 6/1970 | Lee et al. ........................ 307/118 X |
| 3,543,046 | 11/1970 | Tiffany ................................ 307/118 |
| 3,811,051 | 5/1974 | Merrell ............................... 307/118 |
| 3,821,900 | 7/1974 | Preikschat ......................... 73/304 C |

*Primary Examiner*—Charles A. Ruehl

[57] ABSTRACT

A measuring system based on using a ratio of variable capacitance measurements derived from alternate sampling and referencing of at least two capacitance devices and use of a single channel for the capacitance outputs so that the measurements are basically independent of the circuit components, supply voltage, temperature drift problems. The measurements can be high resolution digital signals.

18 Claims, 5 Drawing Figures

4,091,683

SINGLE CHANNEL ELECTRICAL COMPARATIVE MEASURING SYSTEM

FIELD OF THE INVENTION

This invention relates to measurement systems, and more particularly, to a system for deriving measurements from functionally interrelated capacitance devices and using a ratio concept and common components for providing accurate measurements by eliminating circuit variables.

BACKGROUND OF THE INVENTION

Prior art measuring devices primarily rely upon an electrical bridge concept and there are a variety of modifications of this concept. Bridge measuring systems are widely used and valuable where conditions are fairly predictable and a fine degree of accuracy is desired. Highly accurate measurement systems are not easily or cheaply constructed.

In U.S. Pat. No. 3,418,536, issued to Lee, et al, a different approach to measurements is proposed. In the Lee patent, switching techniques are used to provide pulse width modulated output as a measurement value. To accomplish this, pairs of sensing network channels are provided and cross-triggering for operation of the channels is necessary. The Lee System involves separate reference resistors as well as having error sensitivity in response to temperature and component differences. The system proposed in the Lee patent basically does not solve the problem of eliminating errors due to the components, supply voltage variance and the like.

SUMMARY OF THE INVENTION

The present invention involves use of capacitance devices arranged in a functional interrelationship whereby a change in capacitance due to a measured parameter is measurable in terms of a ratio. The ratio relationship of the capacitance devices are interrelated to a single electrical channel for either an analog or digital output signal. In particular, a Metal-Oxide-Semi-Conductor ("MOS") device provides a switching mechanism in which the effects of the switching function are electrically balanced or compensated for by a feedback control. A trigger mechanism or oscillator functions to alternate the coupling each of the capacitors respectively to a reference or bias voltage and to the measured parameter. Because of this, the capacitors are capable of referencing to one another and of obtaining a ratio output. Hence, the measurements are interdependent and a ratio. By coupling the capacitors through a single channel the measurements are always on a parity relative to one another. A reference voltage control is provided so that for a given pair of capacitors, one is being referenced to the voltage control while the other capacitor outputs a measured value. The trigger mechanism provides an output pulse width modulated signal between the referenced control voltage and a trigger level. For one cycle, one capacitor outputs a measured pulse signal for one of the ratio values and for the other cycle, the other capacitor outputs the measured pulse signal for the other of the ratio values. By use of flip-flops a digital output representative of a ratio measurement is obtained Alternately, the ratio can be obtained by analog integration.

DESCRIPTION OF THE PREFERRED EMBODIMENT

Figure 1:
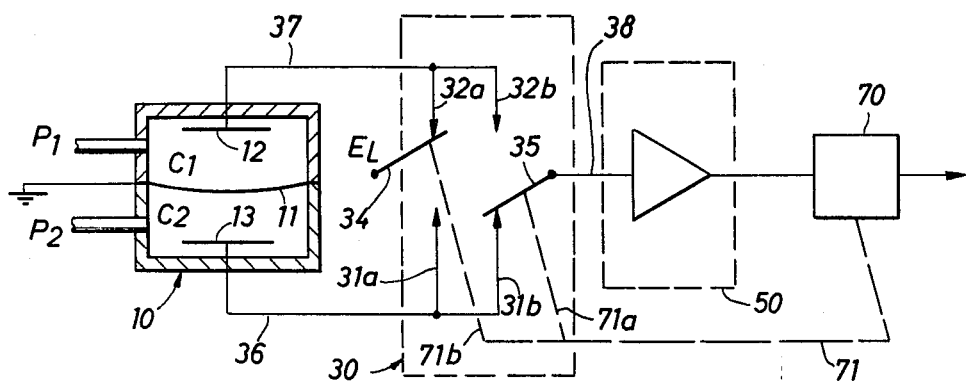
FIG. 1 illustrates schematically a system of measurement embodying the concepts of the present invention.

Referring now to FIG. 1, the overall system illustrating one embodiment of the present invention is illustrated. The system includes a differential pressure transducer 10, a switching means 30, an oscillator means 50 and an output means 70. The purpose of FIG. 1 is to illustrate the switching function in a basic form for a better understanding of the underlying concepts of this invention.

In the pressure transducer 10 two different fluid pressure inputs designated $P_1$ and $P_2$ are put to a transducer 10. The transducer 10 has a diaphragm 11 which is electrically grounded and constitutes a common capacitor plate. The diaphragm 11 separates the transducer into two pressure tight compartments. In the chamber receiving the pressure $P_1$, a capacitor plate 12 in a fixed position and the displacable diaphragm plate 11 provide a capacitance value designated $C_1$. In the chamber receiving the pressure $P_2$, a capacitor plate 13 in a fixed position and the displacable diaphragm plate 11 provide a capacitance value designated $C_2$. The capacitances $C_1$ and $C_2$ are functions of interrelated capacitors in which the capacitance varies as a function of pressure. It should be clearly understood that while precise measurement of pressure values is a difficult proposition, this invention contemplates any system in which interrelated capacitances can be used for obtaining a measurement.

Returning to FIG. 1, the electrical plates 12 and 13 of the variable capacitors in the transducer 10 are coupled to the electrical switching means 30. The switching means 30 provides the function of electrically coupling one of the capacitor plates to a reference voltage while coupling the other capacitor plate to the oscillator means 50 for one cycle and, in an alternate cycle, reversing the connections. Thus, for one duty cycle of the switching means 30 a first capacitor is coupled to a reference voltage and the second capacitor is coupled to the oscillator means 50 and, for the other duty cycle of the switching means, the first capacitor is coupled to the oscillator means 50 and the second capacitor is coupled to the reference voltage. The oscillator means 50, which receives the capacitor output from the switching means 30, provides a corresponding output electrical signal to the output means 70 as a function of pressure which is the parameter being measured. The outputs means 70 provides a suitable output electrical signal representative of the measured pressure which can be converted to analog or digital representations which are representation of the pressure measured. The output means 70 has a control function indicated by the dashed lines 71, 71a and 71b to exercise a switching control on the switch means 30.

As noted before, if the differential pressure transducer 10 typically receives two fluid pressure inputs $P_1$ and $P_2$ and has two capacitance devices which develop variable capacitance values $C_1$ and $C_2$, the capacitance values are a related proportional function of the pressure inputs. The proportional function is based on the relative spacing between the diaphragm capacitor plate 11 and each of the other capacitor plates 12 and 13 which is a function of the differential pressure in the two compartments.

The switching means 30 is schematically illustrated in FIG. 1 only for illustrative purposes and a simplified explanation of the system. A more complete description of the switching means 30 will be made hereafter with respect to FIG. 2. As shown in FIG. 1, switching means can be considered as an electrical, double throw device with a pair of poles 31a, 31b connected to one capacitor plate 13 by a conductor 36 and another pair of poles 32a, 32b connected with the other capacitor plate 12 by a conductor 37. One switching element 34 of the switching means is connected to a reference voltage $E_L$ by a conductor 34a while the other switching element 35 is output to the oscillator means 50 by a conductor 38. The switching elements 34, 35 are arranged to alternate between the pairs of poles so that the reference voltage $E_L$ on conductor 34a and output conductor 38 are alternately connected to the capacitor plates 12, 13 in the respective pressure compartments.

As shown in FIG. 1, the oscillator means 50 serves the function of converting capacitance measurements from the transducer 10 to a frequency related signal. The output means 70 converts the frequency related signals to a suitable form for digital or analog processing.

Before detailing the specifics of the disclosure of the present invention it will be helpful to an understanding of the invention to review certain principles. In this invention, while one of the capacitor devices is coupled to a predetermined reference, the other capacitor device which performs the measurement is coupled to an oscillator. The measuring capacitor device signal generates in a first cycle a first measurable pulse width as a function of the measurement. In the next cycle, the capacitor which has been referenced generates a second measurable pulse width signal as the measurement. By taking a ratio of the measurable pulse width signals the measurements are always functionally related and each component measurement of the ratio is referenced to a common value. Since the output of the capacitors is to the same oscillator, the effect of any component variation is consistent and any drift or error in the circuit components is common to both measurements (excluding errors in the switch). By control of the frequency of the measurement interval for each capacitor, the magnitude of deviation for circuit errors is relative slow changing with respect to the measurement interval and will be rejected to the extent of any common effect for two successive measurements. Also the effect of any circuit error is identical on both measurements for equal capacitance inputs and thus errors become a percent of total reading (relative to zero) which enhances the accuracy of the output.

Again referring to FIG. 1, the capacitance $C_1$ is brought to the reference voltage $E_L$ while the capacitance $C_2$ is output via the conductor 38 to the oscillator 50. The oscillator 50 operates between the reference voltage value and a higher trigger voltage value to provide one cycle of an electrical signal at a frequency $f_1$. At the end of one cycle of an electrical signal at a frequency $f_1$, the output means 70 provides a switching function (illustrated by lines 71, 71a, 71b) to alternate the position of the switching elements 34 and 35. In the alternate position of switching elements 34 and 35, the capacitor $C_2$ is brought to the reference voltage $E_L$ while the capacitance $C_1$ is output via the conductor 37 to the oscillator 50. The oscillator 50 operates to provide one cycle of an electrical signal at a frequency $f_2$.

In the output means 70, one output state represents one complete cycle of $f_1$ and the other output state represents a complete cycle of $f_2$. Because the output state changes only once for each cycle and the alternate cycles represent $f_1$ and $f_2$, then the output states will be a "zero" for the period of one frequency and a "one" for the period of the other. The pulse width of the output states is a function of the measured value.

Figure 2:
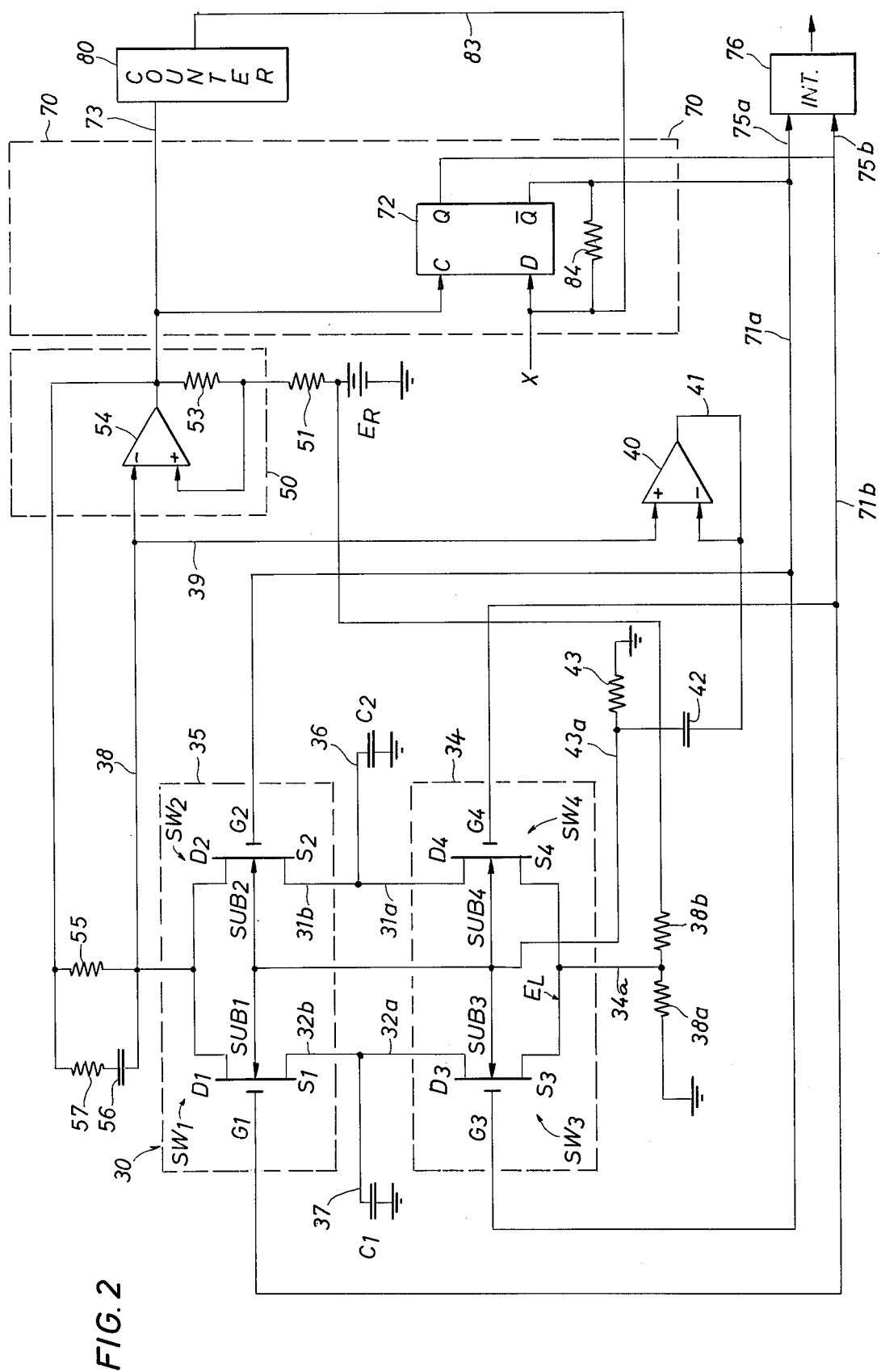
FIG. 2 illustrates a detailed electrical schematic embodiment of the present invention.

Referring now to FIG. 2, a preferred embodiment of the invention is illustrated in detail. Similar reference numerals and designations to those used in FIG. 1 are employed in FIG. 2 where appropriate or analogous.

In the implementation of the present invention the switch means 30 is an insulated Gate Field Effect (MOS) device because its characteristics are compatible with the requirements of this invention. A typical MOS switch is schematically illustrated in FIG. 2 where the following designations are employed:
G = Gate
S = Source
D = Drain
Sub = Substrate The switch configuration of FIG. 2 basically provides four switches $SW_1$, $SW_2$, $SW_3$ and $SW_4$. Switch $SW_1$ has an associated $D_1$, $S_1$, and $G_1$ and $Sub_1$ and the remaining switches $SW_2$, $SW_3$, and $SW_4$ have similarly associated elements. The input of the capacitance $C_1$ is connected by a conductor 37 to the source $S_1$ (by line 32b) and drain $D_3$ (by line 32a) of switches $SW_1$ and $SW_3$. The input of the capacitance $C_2$ is connected by a conductor 36 to the source $S_2$ (by line 31b) and drain $D_4$ (by line 31a) of switches $SW_2$ and $SW_4$. A characteristic of the MOS device is that a gate G must be driven beyond a threshold voltage level to turn a switch "on" and must be driven in an opposite direction below another threshold voltage level to turn the switch "off". The substrate of the MOS device is maintained at a voltage potential equal to or below the voltage potential of the source $S_1$. The gates $G_1$ and $G_4$ are operated by a voltage control supplied via a conductor 71b while gates $G_2$ and $G_3$ are operated by a voltage control supplied via a conductor 71a.

Figure 3:
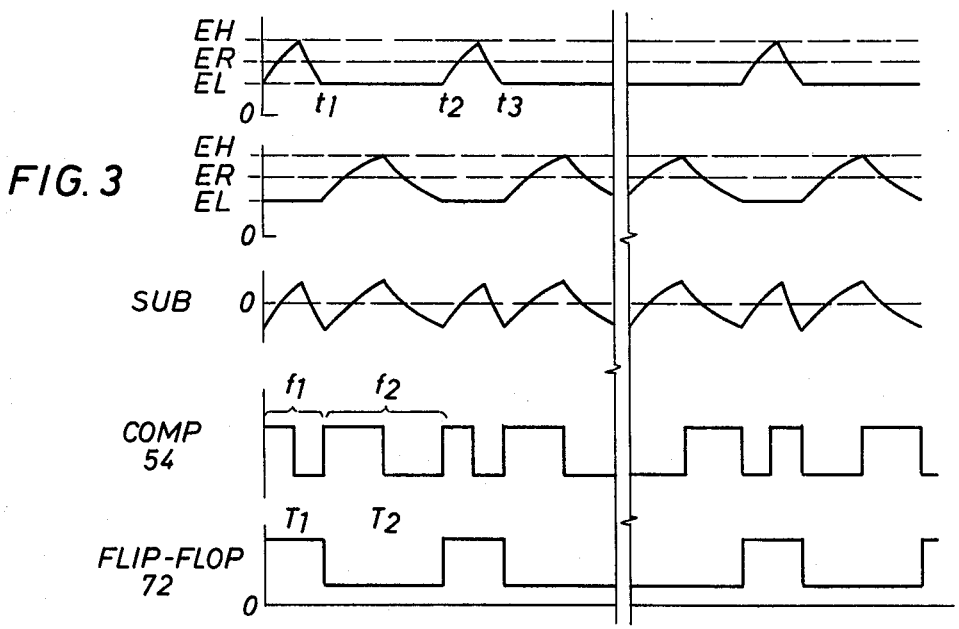
FIGS. 3 and 4 illustrated various waveforms relative to the circuit means of FIG. 2.

An understanding of the circuitry illustrated in FIG. 2 may best be facilitated by beginning with the function and purpose of the oscillator means 50. Associated with the oscillator means 50 is a voltage source or reference $E_R$ which is connected via a resistor 51 to the positive input of a comparator device 54. A resistance 53 is connected between the output of the comparator 54 and the positive input of the comparator 54. The resistances 51 & 53 set a range of voltage drop involved in the operation of the comparator 54. With reference to FIG. 3, if the capacitance $C_1$, is increasing from a voltage level of $E_L$ toward the level $E_H$, the comparator 54 operates in response to the connection of the capacitance $C_1$, being coupled to its negative input terminal to produce a positive output signal until the threshold level $E_H$ is reached. Upon reaching the threshold level $E_H$ the comparator 54 reverses the polarity of the output signal until the lower threshold $E_L$ is reached at a time $t_1$. From the description thus far there is an output from comparator 54 of one cycle of a signal having a frequency $f_1$. Assuming for the moment at the time event $t_1$, that the capacitance $C_1$ is disconnected from comparator 54 and that the capacitance $C_2$ is connected to the comparator 54, then, as the capacitance $C_2$ increases from the level $E_L$, the comparator 54 responds to produce a positive output signal until the threshold $E_H$ is reached. Upon the occurrence of this event, the comparator reverses polarity of the output signal until the lower threshold $E_L$ is reached at a time $t_2$. Thus, from the time $t_1$ to the time $t_2$, there is an output from comparator 54 of one cycle of a signal having a frequency $f_2$. As illustrated in FIG. 3, as the capacitances $C_1$ and $C_2$ are respectively connected to the comparator 54, the comparator produces a one cycle output of a frequency $f_1$ and $f_2$. The span of the threshold values $E_L$ and $E_H$ for the comparator 54 is determined by the value of resistance 53. As will be shown hereinafter, a flip-flop means 72 responds to comparator 54 to provide signals representative of duty cycles $T_1$ and $T_2$.

From FIG. 3, the capacitance $C_1$ and $C_2$ are alternately normalized to a voltage level $E_L$. The voltage $E_L$ is obtained in the following manner. As shown in FIG. 2, a voltage source comprised of resistances 38$a$, 38$b$ and battery $E_R$ provide a voltage potential $E_L$ to conductor 34$a$ which is the lower reference threshold voltage $E_L$. The purpose for this arrangement is to reference a capacitance value $C_1$ or $C_2$ to the lower threshold voltage value $E_L$ while the other capacitance value is connected to the comparator 54 and also to use the common voltage source $E_R$. In this way the capacitances $C_1$ and $C_2$ are referenced to the voltage source $E_L$ as a common "zero" level or reference. Additionally, no recovery time is necessary as would be required to charge the capacitor to a different value or level.

Turning now to the switch means 30, shown in FIG. 2, when the gate $G_1$ enables the switch $SW_1$ the capacitance $C_1$ is connected via conductor 37, source $S_1$, drain $D_1$ and conductor 38 to the input of the comparator 54. At the same time, gate $G_4$ is enabled so that the threshold voltage value $E_L$ of the source is connected via conductor 34$a$, source $S_4$, drain $D_4$ and conductor 31$a$ to the capacitor $C_2$. At this time the gates $G_2$ and $G_3$ disable the switches $SW_2$ and $SW_3$ from operation. The output of the capacitance $C_1$ on conductor 38 is sent via a conductor 39 to a unity gain amplifier 40. The output of amplifier 40 is supplied by a conductor 41 to the other input of the amplifier 40 to a capacitor 42 which, in turn is coupled by a conductor 43$a$ to each of the substrates $Sub_1$, $Sub_2$, $Sub_3$, and $Sub_4$. A resistor 43 references the substrate to electrical ground. The effect of the feedback amplifier 40 to the substrate is illustrated by a waveform entitled "sub" in FIG. 3. The amplifier 40 balances out or cancels the inherent capacitance effect to the substrate in the MOS device thereby eliminating this source of error from the system. The capacitance to the substrate is the dominant source of error in the switch.

When the switch drive is activated to "turn off" gates $G_1$ and $G_4$, the gates $G_2$ and $G_3$ are turned "on". At this time the reference voltage source is connected by conductor 34$a$, source $S_3$, drain $D_3$ and conductor 32$a$ to the capacitor $C_1$ to charge the capacitor to the lower threshold voltage value $E_L$. The capacitor $C_2$ is connected via the conductor 31$b$, source $S_2$, drain $D_2$ and conductor 38 to the comparator 54. A charging resistor 55 is connected between the output of the comparator 54 and its negative input. A series connected capacitor 56 and resistor 57 are parallel connected across the resistor 55. The capacitor 56 is sized to offset inherent residual capacitive effects in the transducer and thereby improve the linearity of response.

The output of the comparator 54 alternates between a cycle of frequency $f_1$ for capacitance $C_1$ and a cycle of frequence $f_2$ for the capacitance $C_2$ as shown in FIG. 3. The output of comparator 54 is supplied to the clock input of a D type flip-flop 72. The flip-flop 72 triggers on the rising edge of a positive input pulse and thus the output "Q" will be one state ("zero") for the period $T_1$ of one frequency $f_1$ and another state ("one") for the period $T_2$ of the other frequency $f_2$. The flip-flop 72 has its output Q connected by a resistor 84 to the other input D to obtain the flip-flop function. The outputs Q and Q̄ of flip-flop 72 are transmitted via conductors 75$a$, 75$b$ to an output processor 76 which can be a conventional analog integrator. The flip-flop 72 also has one output Q coupled via conductor 71$b$ to gates $G_1$ and $G_4$ and the other output Q̄ coupled via conductor 71$b$ to gates $G_2$ and $G_3$. Flip-flop 72 is triggered by the threshold values $E_L$ and $E_H$ in the comparator 54 which, in turn, is triggered by the capacitance values. For a digital representation the pulse output on conductors 75$a$, 75$b$ is used to operate a conventional digital counter to develop numbers representative of the times $t_1$ and $t_2$.

Figure 4:
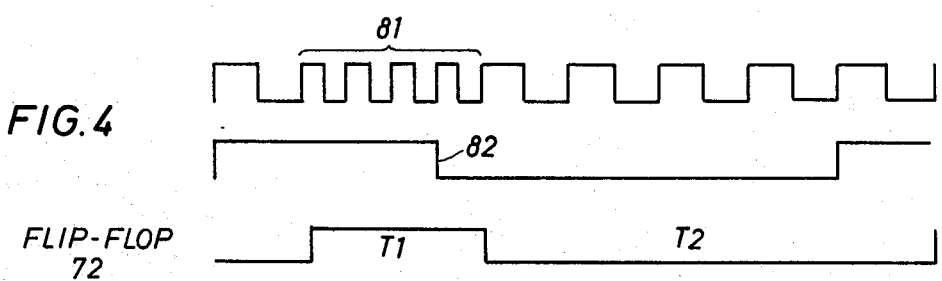

In certain instances, a more precise measurement is desired. To accomplish this objective a counter 80 receives the input from the comparator 54. The counter 80 is arranged to accumulate a desired number of pulses before producing an output signal. As shown in FIG. 4, an input of four pulses 81 of frequency $f_1$ is required before the counter 80 outputs a signal. The output signal from the counter 80 is connected via a conductor 83 to the D input of the flip-flop 72. This, in turn, causes the flip-flop 72 to change states on the next rising edge (fifth pulse). A resistor 84 is interposed between the conductor 83 and the Q output, so as to electrically disconnect the D input for this operation. The output of flip-flop 72, as shown, correctly reflects the extended periods $T_1$ and $T_2$. Thus, the counter can effectively lengthen the time period available for measurement.

Where desired, the counter 80 may be used in conjunction with the time base to measure frequency. For this type of operation conductor 83 is disconnected from the flip-flop 72 and the flip-flop 72 is actuated by a digital control voltage applied at the input X to select the frequency signals $f_1$ and $f_2$. Thus, the digital number accumulated in the counter 80 can then be used to provide a measurement of both $f_1$ and $f_2$ and an appropriate ratiometric function derived digitally from these measurements.

Figure 5:
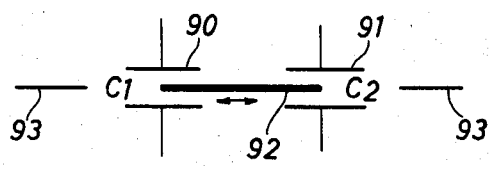
FIG. 5 illustrates a modification of the application of the present invention.

In FIG. 5, a pair of capacitors 90 and 91 have capacitance values $C_1$ and $C_2$. A rod 92 is arranged to shift along an axis 93 so that a shift in position produces a change in relative values of capacitances $C_1$ and $C_2$. Thus, position sensing can be accomplished by calibrating the capacitance ratio for the position of the rod 92. The purpose of FIG. 5 is to illustrate the basis for this invention on interrelated capacitance measurements which can be applied to a variety of instrumentalities for measurement of parameters.

It is also within the scope of the invention to use independent capacitors where one of the capacitors is a fixed reference value and the other capacitor provides a variable response with respect to a parameter.

The operation of the system as schematically illustrated in FIG. 1 and in more detail in FIG. 2, involves charging one capacitor to a reference value while sensing the measured parameter represented by the capacitance in the other capacitor. The sensing of the measured parameter is by a single comparator means 54 and the capacitance effects of the switch are essentially eliminated by the amplifier 40. The comparator means 54 provides, in essence, a pulse width response $T_1$ in the flip-flop 72 as a function of the capacitance $C_1$ and a pulse width response $T_2$ as a function of capacitance $C_2$. In a digital sense the $T_1$ and $T_2$ pulse width are zero and one values. Ratio values of $C_1$ and $C_2$ which are proportionally related to $T_1$ and $T_2$ are basically independent of the circuit components. Each capacitor is referenced to the same source $E_R$ and voltage reference $E_L$ so that the comparison is based upon a common source and value. Should the supply voltage change it will be obvious that the derived ratio remains unchanged. In the MOS device the major capacitance effect is balanced while a high resolution switching effect is achieved. lator 50 there is precise use of matched elements which precludes the introduction of circuit component error.

Although this invention has been described with respect to certain specific embodiments, it will be apparent to those skilled in the transducer and electronic arts that other combinations and modifications of the features and elements disclosed may be made without departing from the scope of this invention.

What is claimed is:

1. Apparatus for processing measured parameters including:
   sensing means for receiving two parameters to be measured and for providing two capacitance measurement values respectively functionally related to the parameters received by said sensing means,
   a single channel means responsive to such capacitance measurement values for producing output signals with frequencies functionally related to such capacitance measurement values from said sensing means,
   means for providing a reference voltage, and
   means for alternately coupling said reference voltage and said single channel means to said sensing means for referencing a capacitance measurement value alternately to said voltage reference and applying a capacitance measurement value to said single channel means.

2. The apparatus as defined in claim 1 and, further including means responsive to said single channel means for operating said alternate coupling means.

3. The apparatus as defined in claim 1 wherein said alternate coupling means includes a field effect switching device.

4. The apparatus as defined in claim 1 wherein said single channel means includes an electrical comparator means responsive to capacitance values for oscillation between a reference voltage value and an upper voltage value.

5. The apparatus as defined in claim 4 wherein said alternate coupling means includes a field effect switching device, said electrical comparator means and said field effect device being referenced to a common voltage source.

6. The apparatus as defined in claim 4 and further including flip-flop means for producing a first output signal for one capacitance value input and for producing a second output signal for the other capacitance value input, and wherein said alternate coupling means includes a field effect switching device which is operated in response to the output signals from said flip-flop means.

7. Electrical measuring apparatus including:
   sensing means having separate components for respectively receiving a parameter for measurement and for producing measured signals related to said parameters;
   means for providing a reference signal to said sensing means;
   single channel means for processing a measured signal and for developing a corresponding pulse width signal;
   means for alternately coupling said separate components from said sensing means to said single channel means and said means for providing a reference signal so that, in one alternate coupling, one of said separate components from said one sensing means is coupled to said reference signal and a second one of said separate components from said sensing means is coupled to said single channel and, in the other alternate coupling, the first one of said separate components from said one sensing means is coupled to said single channel means and the second one of said separate components from said sensing means is coupled to said reference signal.

8. The apparatus as defined in claim 7 and further including means coupled to said single channel means and responsive to said pulse width signal for operating said alternately coupling means at the end of each of said pulse width signals.

9. The apparatus as defined in claim 7 wherein said means for alternately coupling includes a switching device, and a unity gain amplifier coupled between said single channel means and said switching device for balancing out any inherent capacitance effects in said switching device.

10. The apparatus as defined in claim 9 and further including means for receiving alternate pulse width signals and for converting said alternate pulse width signals into a ratio measurement.

11. Apparatus for use in measuring differential pressures as a ratio including:
    functionally interrelated first and second capacitor means for sensing the pressure in at least two pressure conduits where said capacitor means are electrically chargeable at a rate proportion to pressure;
    comparator means responsive to a capacitor means for producing an alternating signal having a time period related to the rate of charging for the capacitor means;
    a source of reference voltage; an insulated-gate metal oxide semi-conductor means coupled between said capacitor means and said comparator means for selectively coupling, in a first condition, one of said first or second capacitor means to said comparator means and for coupling said reference voltage to the other of said first or second capacitor means and for coupling, in a second condition, the said other of said first or second capacitor means to said comparator means and for coupling said reference voltage to the said one of said first or second capacitor means.

12. The apparatus as defined in claim 11 and further including means coupled between said comparator means and said semi-conductor means for providing a feedback signal to said semi-conductor means for cancelling out capacitance effects in said semi-conductor means.

13. Apparatus for use in measuring the magnitude values of a capacitance means where such magnitudes are functionally related to measured parameters, said apparatus being a subcombination comprised of:

comparator means responsive to alternately occurring first and second magnitude values derived from capacitance means for producing an alternating signal where half cycles of said alternating signal have time periods related to the magnitude of said first and second magnitude values, an insulated-gate metal oxide semi-conductor means for receiving such first and second magnitude values at first and second inputs and for receiving a reference voltage from a reference voltage source, said semi-conductor means in a first condition, coupling one of said capacitance magnitude values to said comparator means and coupling such reference voltage to one of said first and second inputs, and in a second condition, coupling the other of said capacitance magnitude values to said comparator means and coupling such reference voltage to the other of said first and second inputs; and means responsive to said alternating signal coupling said semi-conductor means to the output of said comparator means for switching said semi-conductor means between said first and second conditions, thereby alternately coupling such first and second magnitude values to said comparator means.

14. The apparatus as defined in claim 13 and further including means coupled between said comparator means and said semi-conductor means for providing a feedback signal to said semi-conductor means for cancelling out capacitance effects in said semi-conductor means.

15. The apparatus as defined in claim 14 and further including means coupled to said comparator means for obtaining a ratio value of such first and second capacitance values.

16. A method for measuring physical parameters using a common detecting channel and including the steps of:

applying at least one such physical parameter to a first capacitance sensing means which initially is at a reference voltage level for developing a capacitance value as a function of the magnitude of the applied parameter;

electrically clamping a second capacitance sensing means to such reference voltage while such first capacitance sensing means develops a capacitance value;

applying the capacitance value of such first capacitance sensing means to a common electrical channel means and producing a first pulse width signal as a function of the capacitance value developed by such first capacitance sensing means;

switching such reference voltage to the first capacitance sensing means to electrically clamp such first capacitance sensing means to such reference voltage while applying to such second capacitance sensing means another physical parameter for developing a capacitance value as a function of the magnitude of such another applied parameter; and applying the capacitance value developed by such second capacitance sensing means to such common electrical channel means for producing a second pulse width signal as a function of the magnitude of such another applied parameter.

17. The method as defined in claim 16 and further including the step of obtaining said pulse width signals from such common electrical channel and electrically comparing pulse width signals from the first capacitance sensing means to pulse width signals from the second capacitance sensing means for providing a ratio measurement.

18. A method for measuring parameters including the steps of:

applying at least two measurement parameters to capacitance sensing means for developing respective capacitance values as a function of the applied parameters;

electrically clamping a first capacitance sensing means to a reference voltage while connecting a second capacitance sensing means to a single channel capacitance responsive circuit means;

obtaining a first pulse width signal from said circuit means, said pulse width signal being functionally related to the capacitance value of said second capacitance sensing means; and obtaining a second pulse width signal for the other parameter by electrically clamping the second capacitance sensing means to the reference voltage while connecting the first capacitance sensing means to such circuit means.

* * * * *